US012115792B2

(12) United States Patent
Sasaki et al.

(10) Patent No.: US 12,115,792 B2
(45) Date of Patent: Oct. 15, 2024

(54) LIQUID EJECTION APPARATUS

(71) Applicant: BROTHER KOGYO KABUSHIKI KAISHA, Nagoya (JP)

(72) Inventors: Zenichiro Sasaki, Nagoya (JP); Kenta Horade, Tokai (JP); Hironori Takasaki, Ogaki (JP); Toshiro Ueda, Inazawa (JP); Tatsuya Shindo, Nagoya (JP); Ryuji Horata, Gamagori (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/648,990

(22) Filed: Jan. 26, 2022

(65) Prior Publication Data

US 2022/0234357 A1 Jul. 28, 2022

(30) Foreign Application Priority Data

Jan. 27, 2021 (JP) ................................ 2021-011064

(51) Int. Cl.
*B41J 2/165* (2006.01)

(52) U.S. Cl.
CPC ......... *B41J 2/1652* (2013.01); *B41J 2/16579* (2013.01); *B41J 2002/16564* (2013.01)

(58) Field of Classification Search
CPC .................. B41J 2/1652; B41J 2/16579; B41J 2002/16564; B41J 2/16526;
(Continued)

(56) References Cited

U.S. PATENT DOCUMENTS

2007/0139461 A1 6/2007 Izuo
2009/0189933 A1 7/2009 Nakano
(Continued)

FOREIGN PATENT DOCUMENTS

JP 2007-152889 A 6/2007
JP 2007-261130 A 10/2007
(Continued)

OTHER PUBLICATIONS

Notice of Reasons for Refusal dated Aug. 13, 2024 received in Japanese Patent Application No. JP 2021-011064.

*Primary Examiner* — Sharon Polk
(74) *Attorney, Agent, or Firm* — Scully, Scott, Murphy & Presser, P.C.

(57) ABSTRACT

When inspection driving is performed by a liquid ejection head, a signal output circuit outputs a determination signal indicating whether a nozzle is an abnormal nozzle. The inspection driving is driving the liquid ejection head to eject liquid from the nozzle for checking whether the nozzle is the abnormal nozzle. A recovery device performs a recovery operation of discharging liquid from the nozzle. A controller is configured to: in response to receiving a first signal, perform the inspection driving and, in response to determining that the determination signal transmitted from the signal output circuit indicates that the abnormal nozzle exists, store flag information in a memory, the flag information indicating that the recovery operation needs to be performed; and in response to receiving a second signal different from the first signal and determining that the memory stores the flag information, control the recovery device to perform the recovery operation.

21 Claims, 9 Drawing Sheets

(58) Field of Classification Search
CPC ...... B41J 2002/1657; B41J 2002/16573; B41J 2/16508; B41J 2/16517
See application file for complete search history.

(56) References Cited

U.S. PATENT DOCUMENTS

| | | | | |
|---|---|---|---|---|
| 2010/0060690 | A1* | 3/2010 | Hosokawa ............. | B41J 2/0451 347/14 |
| 2012/0287186 | A1* | 11/2012 | Tanaka ................. | B41J 2/16526 347/14 |
| 2013/0182029 | A1 | 7/2013 | Snyder et al. | |
| 2014/0300657 | A1 | 10/2014 | Ike | |
| 2017/0259573 | A1 | 9/2017 | Iida | |
| 2020/0108596 | A1 | 4/2020 | Tsukada | |

FOREIGN PATENT DOCUMENTS

| | | | | |
|---|---|---|---|---|
| JP | 2008036989 | A | | 2/2008 |
| JP | 2009172955 | A | | 8/2009 |
| JP | 2010058416 | A | | 3/2010 |
| JP | 2010058417 | A | | 3/2010 |
| JP | 2010094923 | A | | 4/2010 |
| JP | 2014-61673 | A | | 4/2014 |
| JP | 2014-200982 | A | | 10/2014 |
| JP | 2017-164915 | A | | 9/2017 |
| JP | 2018-83310 | A | | 5/2018 |
| JP | 2020055265 | A | | 4/2020 |
| JP | 2021000733 | A | * | 1/2021 |

* cited by examiner

| | |
|---|---|
| TEMPERATURE RANGE 1 | T < T1 |
| TEMPERATURE RANGE 2 | T1 ≤ T < T2 |
| TEMPERATURE RANGE 3 | T2 ≤ T < T3 |
| TEMPERATURE RANGE 4 | T ≥ T3 |

LIQUID EJECTION APPARATUS

CROSS REFERENCE TO RELATED APPLICATIONS

This application claims priority from Japanese Patent Application No. 2021-011064 filed Jan. 27, 2021. The entire content of the priority application is incorporated herein by reference.

BACKGROUND

As an example of a liquid ejection apparatus that ejects liquid from a nozzle, a printer that ejects ink from a nozzle and records on paper is known. This printer performs, when a particular time set in advance has come, a maintenance operation including a purge for forcibly discharging ink from a head by driving a pump and applying pressure.

SUMMARY

According to one aspect, this specification discloses a liquid ejection apparatus. The liquid ejection apparatus includes a liquid ejection head, a signal output circuit, a recovery device, a memory, and a controller. The liquid ejection head has a nozzle configured to eject liquid. The signal output circuit is configured to, when inspection driving is performed by the liquid ejection head, output a determination signal indicating whether the nozzle is an abnormal nozzle. The inspection driving is driving the liquid ejection head to eject liquid from the nozzle for checking whether the nozzle is the abnormal nozzle. The recovery device is configured to perform a recovery operation of discharging liquid from the nozzle. The controller is configured to: in response to receiving a first signal, perform the inspection driving and, in response to determining that the determination signal transmitted from the signal output circuit indicates that the abnormal nozzle exists, store flag information in the memory, the flag information indicating that the recovery operation needs to be performed; and in response to receiving a second signal different from the first signal and determining that the memory stores the flag information, control the recovery device to perform the recovery operation.

In a case where the inspection driving is performed when the first signal is received and the determination signal indicates that an abnormal nozzle exists, if the recovery operation is immediately performed and if the period from the reception of the first signal to the reception of the second signal is long, the viscosity of the liquid in the liquid ejection head may increase during this period. In this case, it is necessary to perform the recovery operation again when the second signal is received, and as a result, the discharge of the liquid by the recovery operation performed when the first signal is received is wasted.

In this disclosure, when the first signal is received, the inspection driving is performed, and when the determination signal indicates that an abnormal nozzle exists, the flag information is stored. Then, when the second signal is received and the flag information is stored, the recovery operation is performed. With this process, even when the period from the reception of the first signal to the reception of the second signal is long, the wasteful liquid discharge as described above is not performed.

BRIEF DESCRIPTION OF THE DRAWINGS

Embodiments in accordance with this disclosure will be described in detail with reference to the following figures wherein.

DETAILED DESCRIPTION

The above printer performs the maintenance operation when a particular time set in advance has come as described above. However, if a period from the particular time until the printer performs recording on a sheet is long, viscosity of ink in the head may increase during this period, and the maintenance operation may have to be performed again immediately before the recording on the sheet. In this case, as a result, the ink ejection due to the maintenance operation when the particular time has come is wasted.

In view of the foregoing, an aspect of an object of this disclosure is to provide a liquid ejection apparatus configured to suppress wasteful liquid ejection.

Hereinafter, an embodiment of this disclosure will be described.

<Overall Configuration of Printer>

Figure 1:
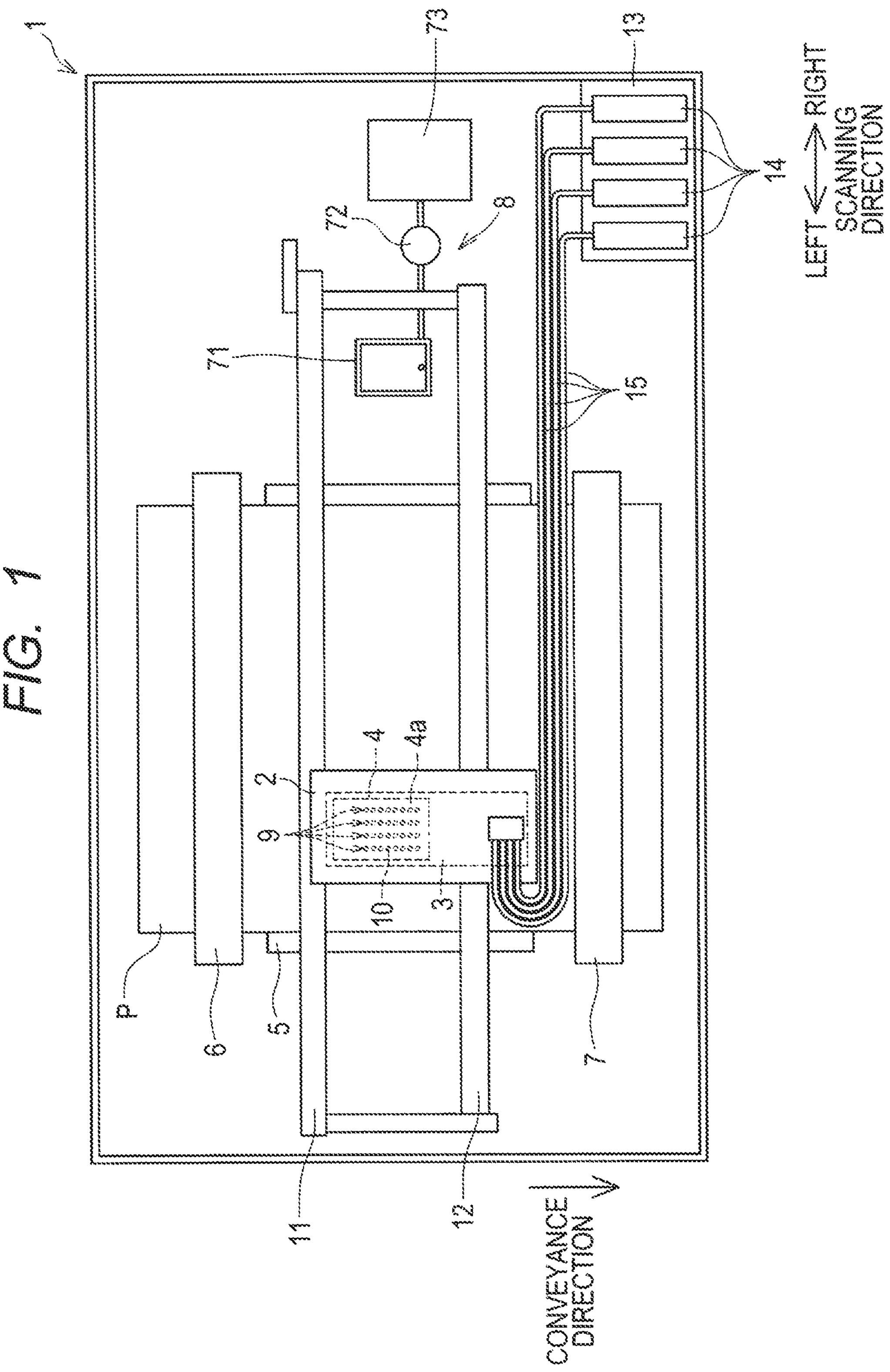
FIG. 1 is a schematic configuration diagram of a printer.

As shown in FIG. 1, a printer 1 according to the embodiment ("liquid ejection apparatus" of this disclosure) includes a carriage 2, a sub tank 3, an inkjet head 4 ("liquid ejection head" of this disclosure), a platen 5, conveyance rollers 6 and 7, a maintenance unit 8, and so on.

The carriage 2 is supported by two guide rails 11 and 12 extending in a scanning direction. The carriage 2 is connected to a carriage motor 86 (see FIG. 4) via a belt and so on (not shown). When the carriage motor 86 is driven, the carriage 2 moves in the scanning direction along the guide rails 11 and 12. In the following, the right side and the left side in the scanning direction are defined as shown in FIG. 1 for description.

The sub tank 3 is mounted on the carriage 2. Here, the printer 1 includes a cartridge holder 13, and four ink cartridges 14 are detachably attached to the cartridge holder 13. The four ink cartridges 14 are arranged in the scanning direction, and store ink ("liquid" of this disclosure) of black, yellow, cyan, and magenta from the one arranged at the right side in the scanning direction. The sub tank 3 is connected to the four ink cartridges 14 mounted on the cartridge holder 13 via four tubes 15. With this configuration, ink of the above four colors is supplied from the four ink cartridges 14 to the sub tank 3.

The inkjet head 4 is mounted on the carriage 2 and connected to the lower end of the sub tank 3. The inkjet head 4 is supplied with ink of the above four colors from the sub tank 3. The inkjet head 4 ejects ink from a plurality of nozzles 10 formed on a nozzle surface 4*a* which is the lower surface of the inkjet head 4. More specifically, the plurality of nozzles 10 are arranged in a conveyance direction perpendicular to the scanning direction to form nozzle arrays 9, and four nozzle arrays 9 are arranged in the scanning direction on the nozzle surface 4*a*. Ink of black, yellow, cyan, and magenta is ejected from the plurality of nozzles 10 from those forming the nozzle array 9 at the right side in the scanning direction.

The platen 5 is arranged below the inkjet head 4 and faces the plurality of nozzles 10. The platen 5 extends over the entire width of a recording sheet P ("medium" of this disclosure) in the scanning direction and supports the recording sheet P from below. The conveyance roller 6 is arranged upstream of the inkjet head 4 and the platen 5 in the conveyance direction. The conveyance roller 7 is arranged downstream of the inkjet head 4 and the platen 5 in the conveyance direction. The conveyance rollers 6 and 7 are connected to a conveyance motor 87 (see FIG. 4) via a gear (not shown) and so on. When the conveyance motor 87 is driven, the conveyance rollers 6 and 7 rotate, and the recording sheet P is conveyed in the conveyance direction.

The maintenance unit 8 includes a cap 71, a suction pump 72, and a waste liquid tank 73. The cap 71 is arranged at the right side of the platen 5 in the scanning direction. When the carriage 2 is located at a maintenance position at the right side of the platen 5 in the scanning direction, the plurality of nozzles 10 face the cap 71.

Figure 4:
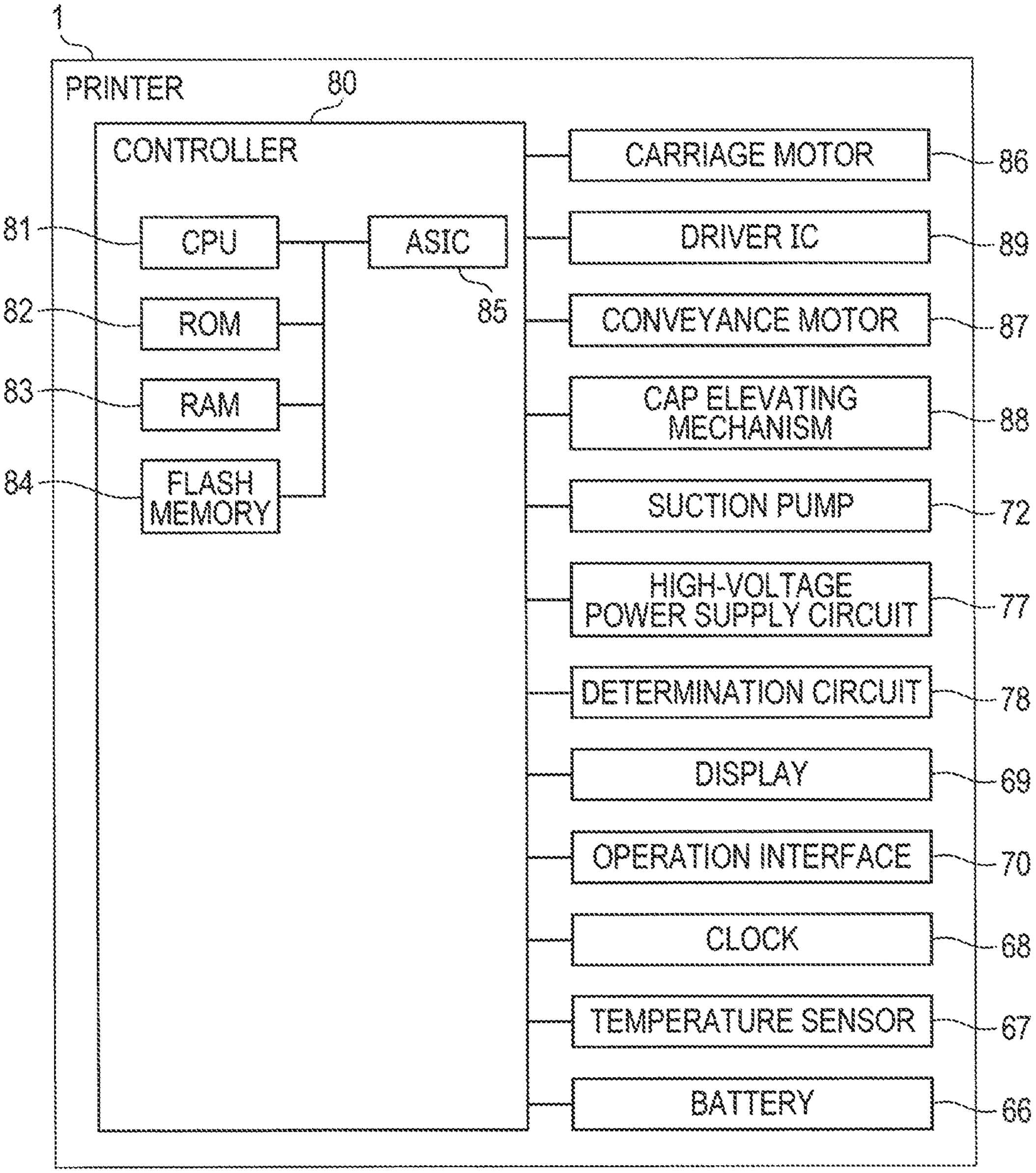
FIG. 4 is a block diagram showing an electrical configuration of the printer.

The cap 71 is configured to be raised and lowered by a cap elevating mechanism 88 (see FIG. 4). When the cap 71 is raised by the cap elevating mechanism 88 in a state where the plurality of nozzles 10 face the cap 71 by positioning the carriage 2 at the maintenance position, the upper end of the cap 71 is in close contact with the nozzle surface 4*a* and the plurality of nozzles 10 are covered with the cap 71. The cap 71 is not limited to a cap covering the plurality of nozzles 10 by being in close contact with the nozzle surface 4*a*. The cap 71 may be a cap that cover a plurality of nozzles 10 by, for example, being in close contact with a frame (not shown) arranged at the periphery of the nozzle surface 4*a* of the inkjet head 4.

The suction pump 72 is a tube pump and so on, and is connected to the cap 71 and the waste liquid tank 73. In the maintenance unit 8, when the suction pump 72 is driven in a state where the plurality of nozzles 10 are covered by the cap 71 as described above, ink in the inkjet head 4 is discharged from the plurality of nozzles 10, which is so-called suction purge. The ink discharged by the suction purge is stored in the waste liquid tank 73.

In the present embodiment, one of a plurality of types of suction purges having different ink discharge amounts is selectively performed. The amount of ink discharged differs among the plurality of types of suction purges, for example, because at least the driving time of the suction pump 72 or the rotation speed of the suction pump 72 is different.

Here, for convenience, it is assumed that the cap 71 covers all the nozzles 10, and the ink in the inkjet head 4 is discharged from all the nozzles 10 in the suction purge. However, the method is not limited to this. For example, the cap 71 may separately include a portion covering the plurality of nozzles 10 constituting the rightmost nozzle array 9 for ejecting black ink, and a portion covering the plurality of nozzles 10 constituting the left three nozzle arrays 9 for ejecting color ink (yellow, cyan, magenta ink), and may be configured to selectively discharge either black ink or color ink in the inkjet head 4 in the suction purge. Alternatively, for example, a cap may be provided individually for each nozzle array 9, so that ink is discharged from the nozzles 10 individually of each nozzle array 9 in the suction purge.

Figure 2:
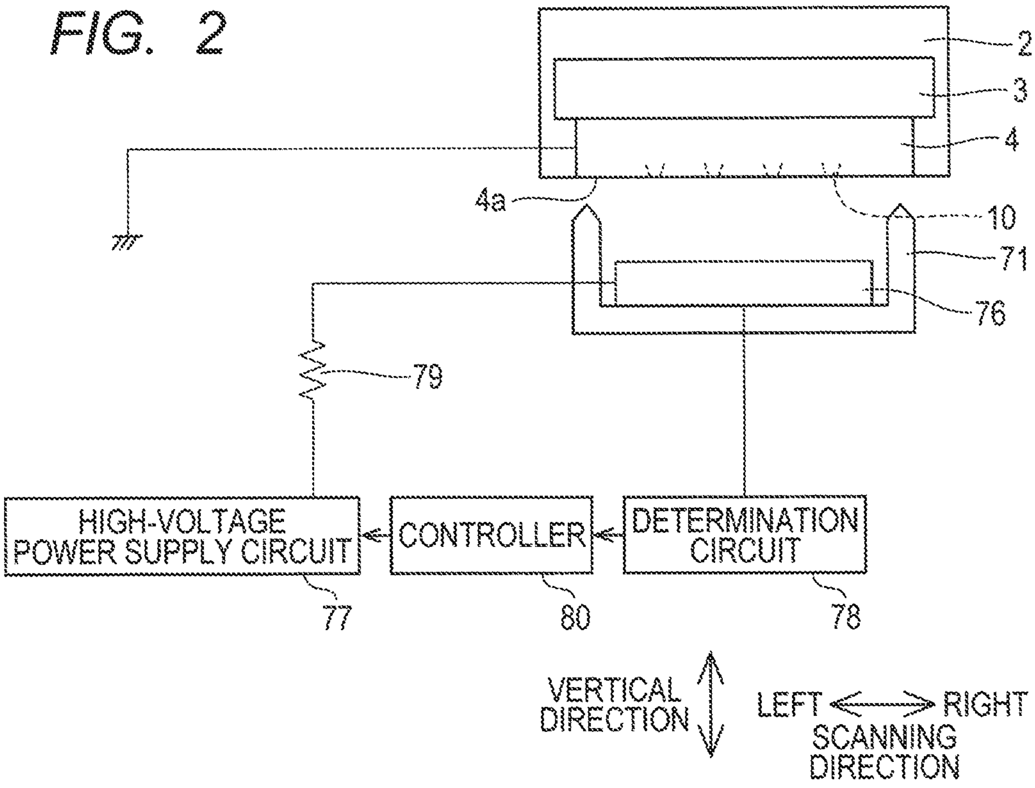
FIG. 2 is a diagram for explaining a detection electrode arranged in a cap and a connection relationship among the detection electrode, a high-voltage power supply circuit, and a determination circuit.

As shown in FIG. 2, a detection electrode 76 having a rectangular planar shape is arranged in the cap 71. The detection electrode 76 is connected to a high-voltage power supply circuit 77 via a resistor 79. A particular positive potential (for example, approximately 600 V) is applied to the detection electrode 76 by the high-voltage power supply circuit 77 at the time of determination driving described later. The inkjet head 4 is held at the ground potential. As a result, a particular potential difference is generated between the inkjet head 4 and the detection electrode 76. A determination circuit 78 is connected to the detection electrode 76. The determination circuit 78 compares the potential of a signal output from the detection electrode 76 with a threshold value Vt, and outputs a signal according to the result.

Figure 3A:
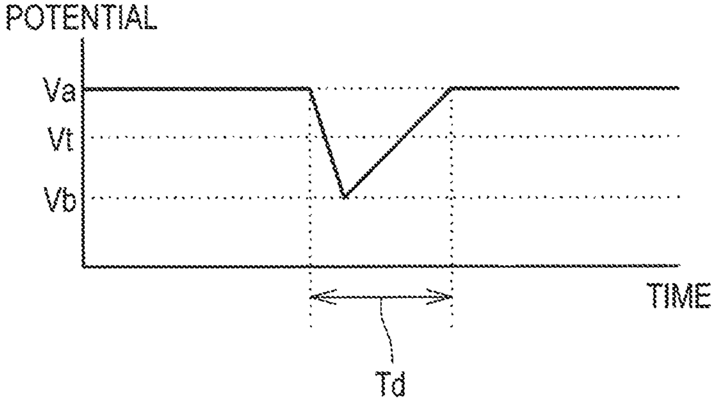
FIG. 3A is a diagram showing a change in a voltage value of the detection electrode when ink is ejected from a nozzle.

More specifically, since a potential difference is generated between the inkjet head 4 and the detection electrode 76, ink ejected from the nozzle 10 is charged. When ink is ejected from the nozzle 10 toward the detection electrode 76 in a state where the carriage 2 is located at the maintenance position, as shown in FIG. 3A, the charged ink approaches the detection electrode 76 and, until the ink lands on the detection electrode 76, the potential of the detection electrode 76 drops from a potential Va at the time when the inkjet head 4 is not driven, and reaches a potential Vb lower than the potential Va. Then, after the charged ink lands on the detection electrode 76, the potential of the detection electrode 76 gradually rises and returns to the potential Va. That is, the potential of the detection electrode 76 changes during a driving period Td of the inkjet head 4.

Figure 3B:
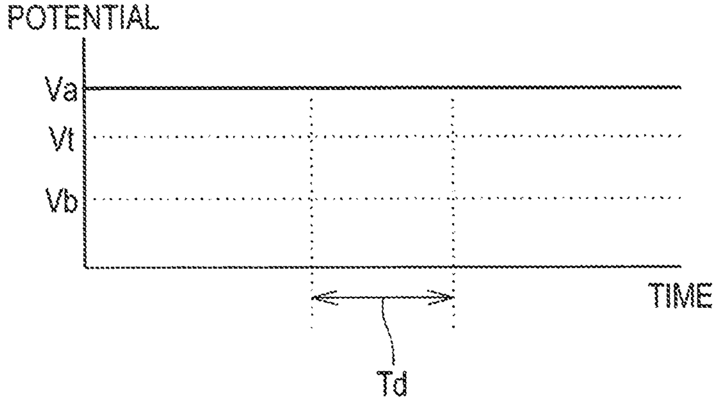
FIG. 3B is a diagram showing a change in the voltage value of the detection electrode when ink is not ejected from the nozzle.

When ink is not ejected from the nozzle 10, as shown in FIG. 3B, the potential of the detection electrode 76 is almost unchanged from the potential Va during the driving period Td of the inkjet head 4. Thus, in the determination circuit 78, a threshold value Vt ($Va>Vt>Vb$) is set in order to distinguish these states. Then, the determination circuit 78 compares the lowest potential of the voltage signal output from the detection electrode 76 with the threshold value Vt during the driving period Td of the inkjet head 4, and outputs a determination signal according to the determination result. In the present embodiment, the combination of the detection electrode 76, the high-voltage power supply circuit 77, the resistor 79, and the determination circuit 78 serves as the "signal output circuit" of this disclosure. This signal output circuit outputs a determination signal depending on whether the nozzle 10 is an abnormal nozzle in which ink is not ejected. This determination of whether the nozzle 10 is an abnormal nozzle is performed individually for each nozzle.

Here, the high-voltage power supply circuit 77 applies a positive potential to the detection electrode 76. Alternatively, the high-voltage power supply circuit 77 may apply a negative potential (for example, approximately −600 V) to the detection electrode 76. In this case, contrary to the above, when ink is ejected from the nozzle 10 toward the detection electrode 76 in a state where the carriage 2 is located at the maintenance position, the charged ink approaches the detection electrode 76 and the potential of the detection electrode 76 rises from the potential Va until the ink lands on the detection electrode 76 and, after the ink lands on the detection electrode 76, the potential of the detection electrode 76 gradually decreases and returns to the potential Va.

<Electrical Configuration of Printer>

Next, the electrical configuration of the printer 1 will be described. As shown in FIG. 4, the printer 1 includes a controller 80. The controller 80 includes a CPU (Central Processing Unit) 81, a ROM (Read Only Memory) 82, a RAM (Random Access Memory) 83, a flash memory 84, an ASIC (Application Specific Integrated Circuit) 85, and so on. The controller 80 controls the operations of the carriage motor 86, the inkjet head 4, the conveyance motor 87, the cap elevating mechanism 88, the suction pump 72, the high-voltage power supply circuit 77, a driver IC 89, and so on. In the present embodiment, the controller 80 controls the inkjet head 4 by controlling the driver IC 89. Further, a determination signal is input to the controller 80 from the determination circuit 78.

In addition to the configuration described above, the printer 1 includes a display 69, an operation interface 70, a clock 68, a temperature sensor 67, and a battery 66. The display 69 is, for example, a liquid crystal display provided on the housing of the printer 1. The controller 80 controls the display 69 to display information and so on necessary for the operation of the printer 1. The operation interface 70 is, for example, a button provided on the housing of the printer 1, a touch panel provided on the display 69, and so on. By operating the operation interface 70, the user inputs a signal to the controller 80.

In the present embodiment, the operation interface 70 includes a power switch (not shown). By operating the power switch, the user switches the power of the printer 1 on and off. When the user operates the power switch of the operation interface 70 to turn on the power of the printer 1, the operation interface 70 outputs a power-on signal indicating that the power of the printer 1 has been turned on ("second signal" of this disclosure), and the controller 80 receives this power-on signal.

The clock 68 measures the time, and the controller 80 receives a time signal indicating the time ("first signal" of this disclosure) from the clock 68. The temperature sensor 67 detects, for example, the temperature of the inkjet head 4. The controller 80 receives a temperature signal indicating the temperature from the temperature sensor 67.

The battery 66 is connected to at least the controller 80 and the clock 68. Power is supplied to the printer 1 from an outlet (not shown), at which time the battery 66 is charged. In a state where the printer 1 is unplugged, power is supplied from the battery 66 to at least the controller 80 and the clock 68.

In the controller 80, only the CPU 81 may perform various processes, only the ASIC 85 may perform various processes, or the CPU 81 and the ASIC 85 may cooperate with each other to perform various processes. Further, in the controller 80, one CPU 81 may perform processing independently, or a plurality of CPUs 81 may share the processing. Further, in the controller 80, one ASIC 85 may perform the processing independently, or a plurality of ASICs 85 may share the processing.

<Control During Standby>

The control by the controller 80 during standby when recording on the recording sheet P is not performed in the printer 1 will be described. In the printer 1, the controller 80 performs processing according to the flow of FIG. 5A during the standby. The flow of FIG. 5A is started, for example, when the plug is first inserted in the printer 1 and the power supply to the printer 1 is started, and is continued (that is, repeatedly executed) while power is supplied from the plug or the battery 66 to the controller 80 and the clock 68.

The flow of FIG. 5A will be described in more detail. The controller 80 is in the standby state while the time signal received from the clock 68 does not indicate a particular time (S101: NO), the temperature range including the temperature indicated by the temperature signal received from the temperature sensor 67 is the same as the temperature range including the temperature indicated by the temperature signal received from the temperature sensor 67 when inspection driving described later is performed last time (S102: NO), and the power-on signal is not received (S103: NO).

Figures 5A, 5B:
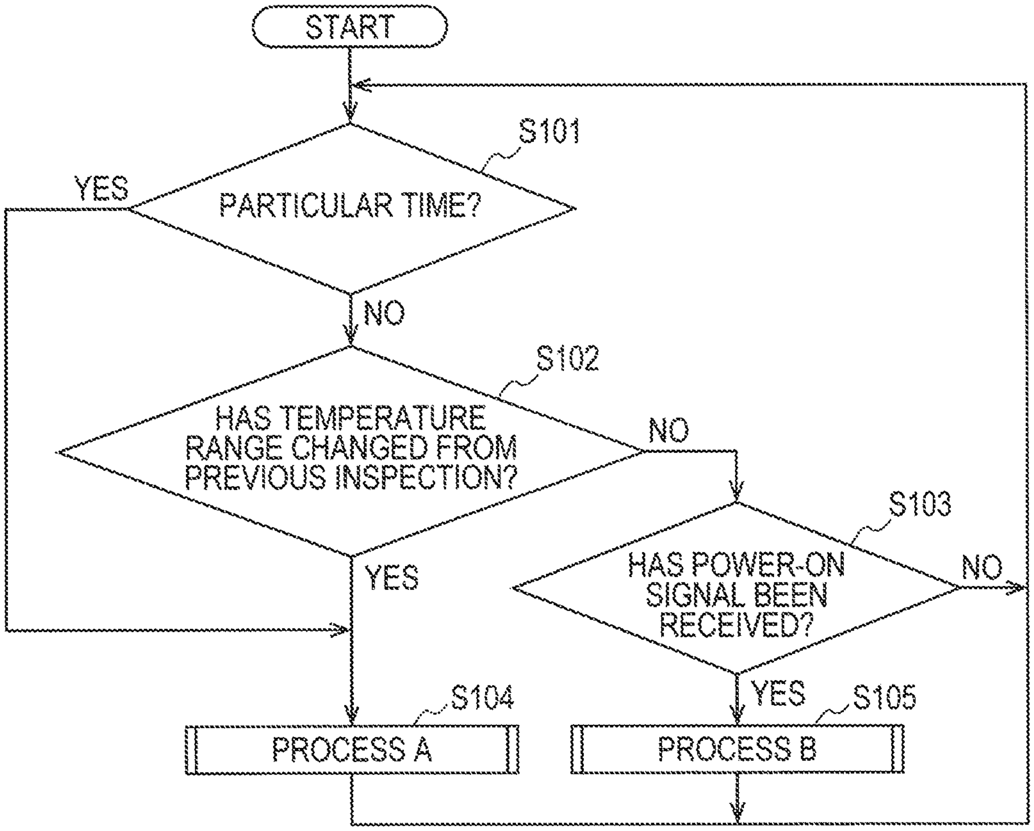
FIG. 5A is a flowchart showing a flow of processing in a state where power is supplied to at least a controller and a clock.
FIG. 5B is a table for explaining information on stored temperature ranges.

For example, information of temperature ranges 1 to 4 as shown in FIG. 5B is stored in the flash memory 84. Temperatures T1, T2, and T3 in FIG. 5B have a magnitude relationship of T1<T2<T3. The controller 80 stores, in the flash memory 84, the information of the temperature T indicated by the temperature signal received from the temperature sensor 67 when the inspection driving is performed. The controller 80 makes the determination of S102 based on the temperature T indicated by the temperature signal received from the temperature sensor 67, the temperature range information of FIG. 5B stored in the flash memory 84, and the temperature T stored during the inspection driving.

In the present embodiment, among the temperature ranges shown in FIG. 5B, the temperature range including the temperature T indicated by the temperature signal received from the temperature sensor 67 when the inspection driving is performed corresponds to "first temperature range". In the present embodiment, when the temperature T indicated by the temperature signal received from the temperature sensor 67 thereafter falls in another temperature range different from the first temperature range, the other temperature range corresponds to "second temperature range".

When the time signal received from the clock 68 indicates that the time is a particular time (S101: YES), the controller 80 executes a process A (S102). In the present embodiment, the time signal indicating that the time is a particular time corresponds to "first signal".

The controller 80 also executes the process A (S104) when the temperature range including the temperature indicated by the temperature signal received from the temperature sensor 67 differs from the temperature range including the temperature indicated by the temperature signal received from the temperature sensor 67 when the inspection driving was performed last time (S102: YES). When the power-on signal is received (S103: YES), the controller 80 executes the process B (S105).

<Process A>

Figure 6:
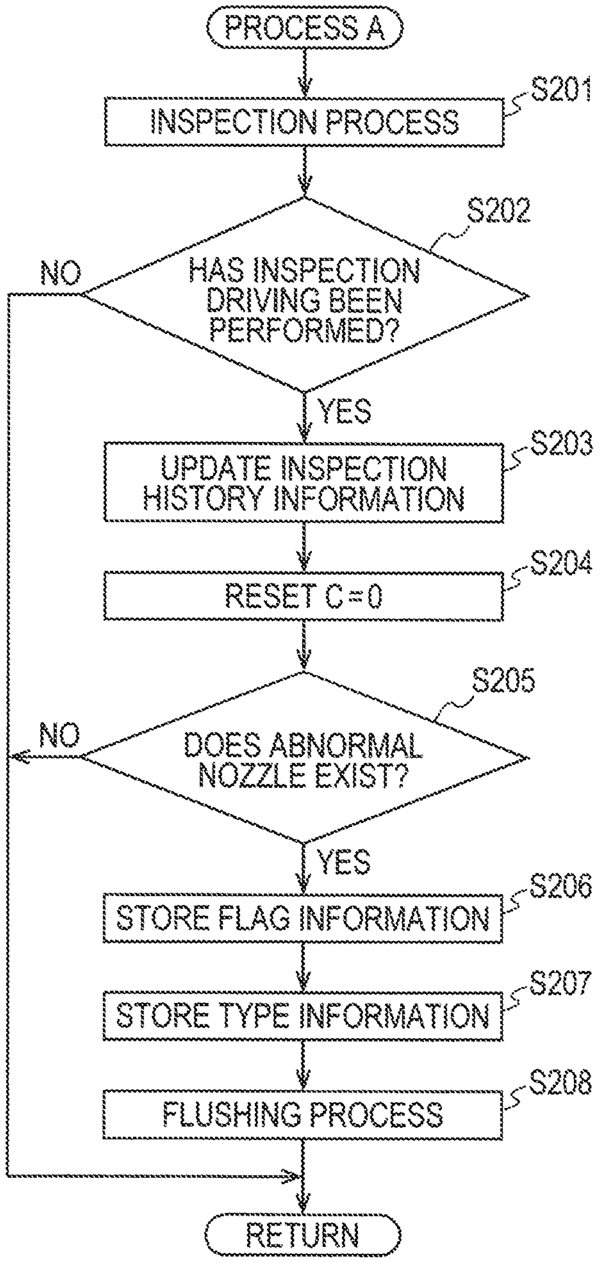
FIG. 6 is a flowchart showing a flow of a process A in FIG. 5A.

The process A will be described. As shown in FIG. 6, in the process A, the controller 80 first executes an inspection process (S201). In the inspection process, the controller 80 transmits a drive signal to the driver IC 89 for performing inspection driving for driving the inkjet head 4 so as to eject ink sequentially from the plurality of nozzles 10.

Subsequently, the controller 80 determines whether the inspection driving has been actually performed by the inspection process of S201 (S202). The case where the inspection driving is actually performed by the inspection process is, for example, a case where a plug is inserted and the inkjet head 4 is ready to be driven for inspection by the electric power supplied from the plug. The case where the inspection driving is not actually performed by the inspection process is, for example, the case where the plug is unplugged and the inkjet head 4 is not ready to be driven for inspection.

If the inspection driving is not actually performed by the inspection process (S202: NO), the flow returns to the flow of FIG. 5A. When the inspection driving is actually performed by the inspection process (S202: YES), the controller 80 updates inspection history information (S203). More specifically, the flash memory 84 stores the inspection history information, which is information on the time when the inspection driving was performed last time. In S203, the controller 80 updates the information of the time when the inspection driving was performed last time, which is stored in the flash memory 84, based on the time signal from the clock 68.

Subsequently, the controller 80 resets the variable C to 0 (S204). The variable C corresponds to the number of recording sheets P on which recording has been performed since the inspection driving was performed last time.

Subsequently, when the determination signal output from the determination circuit 78 during the inspection driving indicates that an abnormal nozzle does not exist (S205: NO), the flow returns to the flow of FIG. 5A. When the determination signal output from the determination circuit 78 during the inspection driving indicates that an abnormal nozzle exists (S205: YES), the controller 80 stores flag information indicating that an abnormal nozzle exists in the flash memory 84 (S206).

Subsequently, the controller 80 stores, in the flash memory 84, the type information indicating the type of suction purge to be performed (S207). The processing will be described in detail. In S207, the controller 80 stores a type of suction purge in the flash memory 84 as the type information such that a larger amount of ink is discharged in the suction purge as the determination signal output from the determination circuit 78 during the inspection driving indicates that a larger number of nozzles 10 are abnormal nozzles.

One example will be described. The inkjet head 4 has 100 nozzles. Of the 100 nozzles, 80 nozzles are designated as inspection nozzles to be inspected. For the 80 nozzles, determination of whether a nozzle is an abnormal nozzle is performed one by one. Of the 80 inspection nozzles, the result may be that 5 nozzles are abnormal nozzles, or 20 nozzles are abnormal nozzles, for example. If the result is 5 abnormal nozzles which is smaller than or equal to a threshold (for example, 10 abnormal nozzles), small suction purge is performed (that is, a small amount of ink is discharged). If the result is 20 abnormal nozzles which is larger than the threshold, large suction purge is performed (that is, a large amount of ink is discharged).

Subsequently, the controller 80 executes a flushing process (S208) and returns to the flow of FIG. 5A. In the flushing process, the controller 80 controls the driver IC 89 to cause the inkjet head 4 to perform flushing to discharge ink from the nozzle 10. At this time, the controller 80 may discharge ink only from the abnormal nozzle or may discharge ink from all the nozzles 10 of the inkjet head 4 including the abnormal nozzle.

<Process B>

Figure 7:
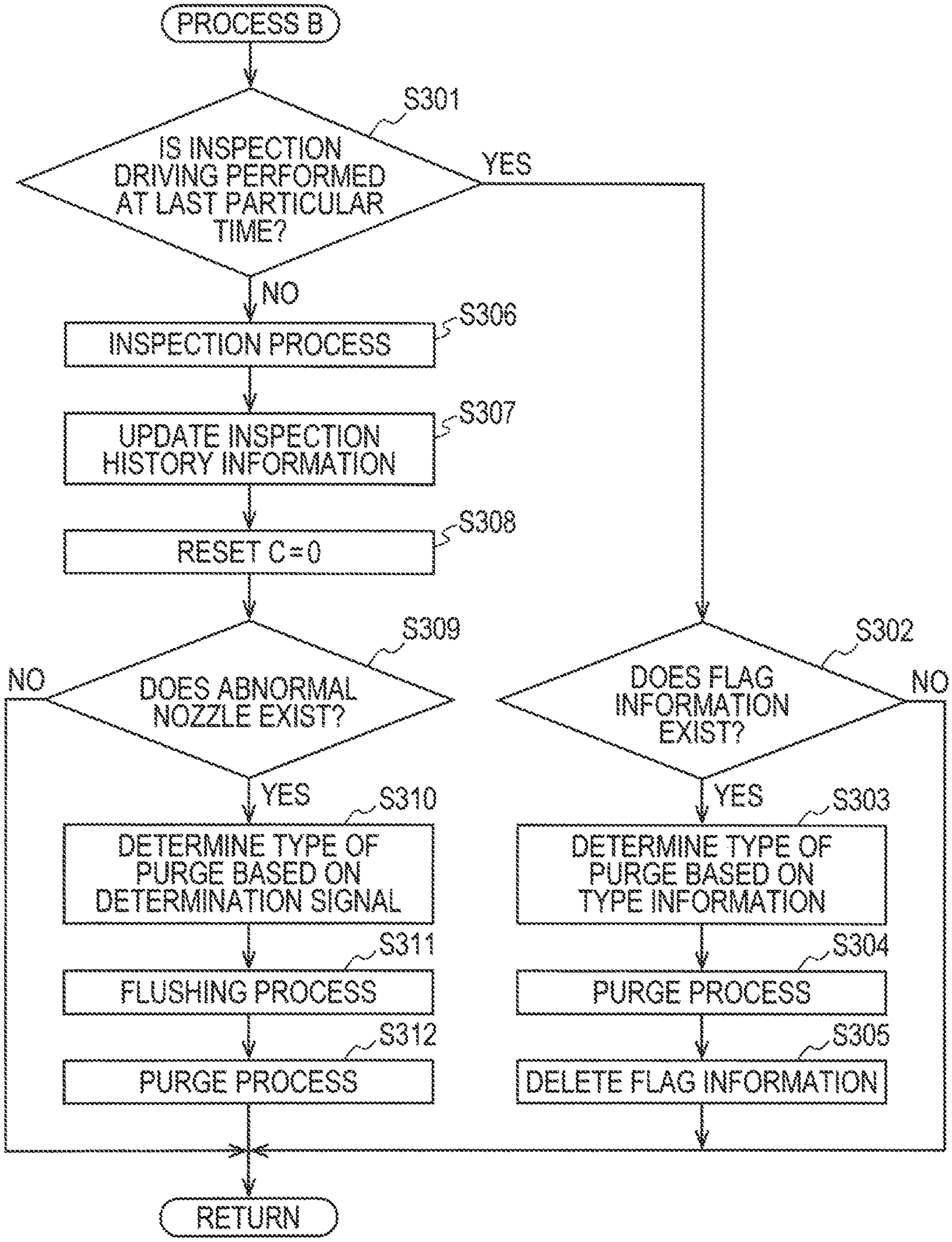
FIG. 7 is a flowchart showing a flow of a process B in FIG. 5A.

The process B will be described. As shown in FIG. 7, in the process B, first, based on the above-mentioned inspection history information, it is determined whether the inspection driving is performed at the last particular time before the power is turned on (S301).

When the inspection driving is performed at the last particular time before the power is turned on (S301: YES), the controller 80 subsequently determines whether the flag information is stored in the flash memory 84 (S302).

If the flag information is not stored in the flash memory 84 (S302: NO), the process returns to the flow of FIG. 5A. When the flag information is stored in the flash memory 84 (S302: YES), the controller 80 determines the type of suction purge based on the type information (S303) and executes the purge process (S304). In the purge process of S304, the controller 80 performs the suction purge determined in S303. After the purge process of S304 is completed, the controller 80 deletes the flag information stored in the flash memory 84 (S305), and returns to the flow of FIG. 5A.

When the inspection driving is not performed at the last particular time before the power is turned on (S301: NO), the controller 80 subsequently executes the inspection process similar to S201 (S306), updates the inspection history information (S307), and resets the variable C to 0 (S308) similarly to S203 and S204. The process B is a process performed when the power is turned on, that is, a process performed in a state where power is supplied from the plug. Thus, when the inspection process of S306 is executed, inspection driving is performed in the inkjet head 4.

Subsequently, when the determination signal output from the determination circuit 78 during the inspection driving performed by the inspection process of S306 indicates that an abnormal nozzle does not exist (S309: NO), the controller 80 returns to the flow of FIG. 5A.

When the determination signal indicates that an abnormal nozzle exists (S309: YES), the controller 80 subsequently determines the type of suction purge to be performed based on the determination signal output from the determination circuit 78 during the inspection driving performed by the inspection process of S306 (S310). In S310, the controller 80 determines the type of suction purge to be performed such that, as the determination signal indicates that a larger number of nozzles 10 are abnormal nozzles, a larger amount of ink is discharged in the suction purge.

Subsequently, the controller 80 executes a flushing process as in S208 (S311), and then executes a purge process (S312). In the purge process of S312, the controller 80 performs the suction purge determined in S310. After the purge process of S312 is completed, the flow returns to the flow of FIG. 5A.

In the present embodiment, the inkjet head 4 for flushing and the maintenance unit 8 for performing the suction purge correspond to "recovery device" In the present embodiment, the combination of flushing and suction purge corresponds to "recovery operation", and among them, the flushing corresponds to "first part of the recovery operation", and the suction purge corresponds to "second part of the recovery operation excluding the first part".

<Control During Recording>

Next, the control when the printer 1 performs recording on the recording sheet P will be described. When the printer 1 receives a recording instruction ("ejection instruction") instructing to perform recording on the recording sheet P, the controller 80 performs processing according to the flow of FIG. 8.

Figure 8:
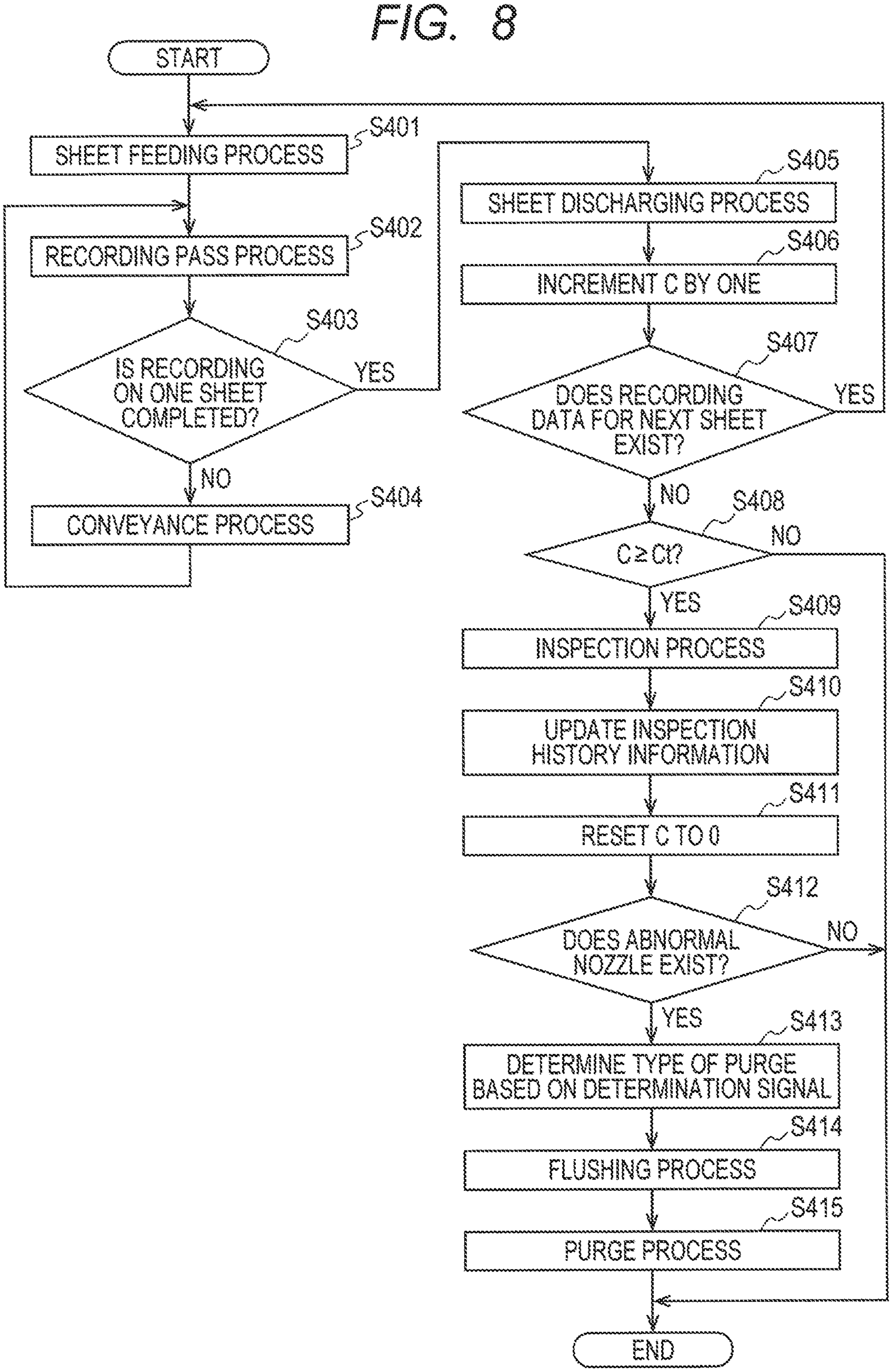
FIG. 8 is a flowchart showing a flow of processing at the time of recording.

The flow of FIG. 8 will be described in more detail. The controller 80 first executes a sheet feeding process (S401). In the sheet feeding process, the controller 80 controls a sheet feeding mechanism (not shown) and the conveyance motor 87 to supply the recording sheet P to the sheet feeding mechanism, and controls the conveyance rollers 6 and 7 to convey the recording sheet P to a position where an area in which an image is recorded in the first recording pass of the recording sheet P faces the plurality of nozzles 10 of the inkjet head 4.

Subsequently, the controller 80 executes a recording pass process (S402). In the recording pass process, the controller 80 controls the carriage motor 86 to move the carriage 2 in the scanning direction, and controls the driver IC 89 to drive the plurality of driving elements 22*a*, thereby performing a recording pass of causing the inkjet head 4 to eject ink from the plurality of nozzles 10 toward the recording sheet P.

Subsequently, when the recording on one recording sheet P is not completed (S403: NO), the controller 80 executes a conveyance process (S404) and returns to S402. In the conveyance process, the controller 80 controls the conveyance motor 87 to cause the conveyance rollers 6 and 7 to convey the recording sheet P by a particular distance.

When the recording of an image on one recording sheet P is completed (S403: YES), the controller 80 executes a sheet discharging process (S405) and increments the value of the variable C by one (S406). In the sheet discharging process of S405, the controller 80 controls the conveyance motor 87 to cause the conveyance rollers 6 and 7 to discharge the recording sheet P for which recording has been completed.

When recording data for recording on the next recording sheet P exists (S407: YES), the process returns to S401. If no recording data exists (S407: NO) and the value of the variable C is less than a particular value Ct (S408: NO), the process ends.

When the value of the variable C is larger than or equal to the particular value Ct (S408: YES), the controller 80 executes the processes of S409 to S415 as in S306 to S312, and ends the process.

<Effects>

Here, a case will be considered in which, when the inspection driving is performed in response to receiving a time signal indicating that the time is a particular time, and the determination signal output from the determination circuit 78 during the inspection driving indicates that an abnormal nozzle exists, the recovery operation is immediately performed. In this case, if the period elapsed from the reception of the time signal indicating that the time is the particular time to the reception of the power-on signal is long, the viscosity of ink in the inkjet head 4 may increase during this period. In this case, it is necessary to perform the recovery operation again when the power-on signal is received, and as a result, the ink is wastefully discharged by the recovery operation performed when the time signal indicating that the time is the particular time is received.

In the present embodiment, when the time signal indicating that the time is the particular time is received, the inspection driving is performed, and the flag information is stored when the determination signal output from the determination circuit 78 during the inspection driving indicates that an abnormal nozzle exists. After that, when the power-on signal is received, the recovery operation is performed when the flag information is stored. As a result, even when the period elapsed from the reception of the time signal indicating that the time is the particular time to the reception of the power-on signal is long, the wasteful ink discharge as described above is not performed.

When the inspection driving is performed at a particular time, for example, the particular time is desirably a time zone such as nighttime when the user is unlikely to use the printer 1. However, even a small sound is noisy at night, so if the recovery process is executed immediately after the inspection driving, it may become noisy. Thus, the noise problem is solved by performing the recovery process at the timing when the power-on signal is received when the user uses the printer 1, without performing the recovery process immediately after the inspection driving.

In the present embodiment, when the time signal indicating that the time is the particular time is received, the inspection driving is performed, and the type information of suction purge is stored based on the determination signal output from the determination circuit 78 during the inspection driving. After that, when the power-on signal is received, if the flag information is stored, the suction purge of the stored type information is performed. As a result, an appropriate suction purge is performed depending on the number of abnormal nozzles and so on.

In the present embodiment, when a time signal indicating that the time is the particular time is received, the inspection driving is performed, and the flushing which is a part of the recovery operation is performed when the determination signal output from the determination circuit 78 during the inspection driving indicates that an abnormal nozzle exists. After that, when the power-on signal is received, the suction purge, which is the second part of the recovery operation excluding the first part, is performed. As a result, the time required for the recovery operation performed when the power-on signal is received is shortened.

As described above, when the particular time is set in a time zone such as nighttime, the user may feel noise even if the sound is small. When comparing purging that drives the suction pump 72 and flushing that does not drive the suction pump 72 as a recovery operation, the purging that drives the suction pump 72 is louder than the flushing that does not drive the suction pump 72. Thus, only flushing is performed at a particular time (immediately after the inspection driving). As a result, the user is less likely to feel noise.

In the present embodiment, since the inspection driving is performed at a particular time, for example, the inspection driving is performed at a time when the user does not frequently use the printer 1. The time when the user does not use the printer 1 frequently is, for example, nighttime, lunch break time, early morning, and so on. The user may set the particular time according to the usage cycle.

When recording is performed on a large number of recording sheets P, paper dust generated from the recording sheets P may gather in the nozzle 10 and an abnormal nozzle may occur. In the present embodiment, the inspection driving is performed again when the number of recording sheets P recorded by the inkjet head 4 reaches a particular number after the last inspection driving is performed last time (when $C \geq Ct$ is satisfied). As a result, an abnormal nozzle is accurately grasped.

In the present embodiment, when the number of recording sheets P recorded by the inkjet head 4 reaches a particular number during recording on a plurality of recording sheets P, the inspection driving is performed again after the recording on all the plurality of sheets P is completed. As a result, recording is not interrupted even if the number of recording sheets P recorded by the inkjet head 4 reaches the particular number during recording on a plurality of recording sheets P.

When the temperature of the inkjet head 4 changes greatly, the viscosity of the ink in the nozzle 10 may change, and the state of whether the nozzle is abnormal may change. Thus, in the present embodiment, the inspection driving is performed again when the temperature range including the temperature indicated by the temperature signal received from the temperature sensor 67 is different from the temperature range including the temperature indicated by the temperature signal received from the temperature sensor 67 when the inspection driving was performed last time. As a result, the abnormal nozzle is accurately grasped.

When the printer 1 is unplugged at a particular time and power is supplied from the battery 66 to the controller 80, the inspection process is executed, but the inspection driving is not performed. When the battery 66 is out of power, the inspection process is not executed even at the particular time, and naturally, the inspection driving is not performed.

Thus, in the present embodiment, at the time of reception of the power-on signal, in a case where the inspection driving is not performed at the last particular time before the reception of the power-on signal, the inspection driving is performed. As a result, an abnormal nozzle is grasped and the necessary recovery operation is performed.

<Modifications>

While the disclosure has been described in detail with reference to the above aspects thereof, it would be apparent to those skilled in the art that various changes and modifications may be made therein without departing from the scope of the claims.

In the above-described embodiment, the controller 80 executes the process B when the power-on signal is received in the standby state, but this disclosure is not limited to this.

Figure 9:
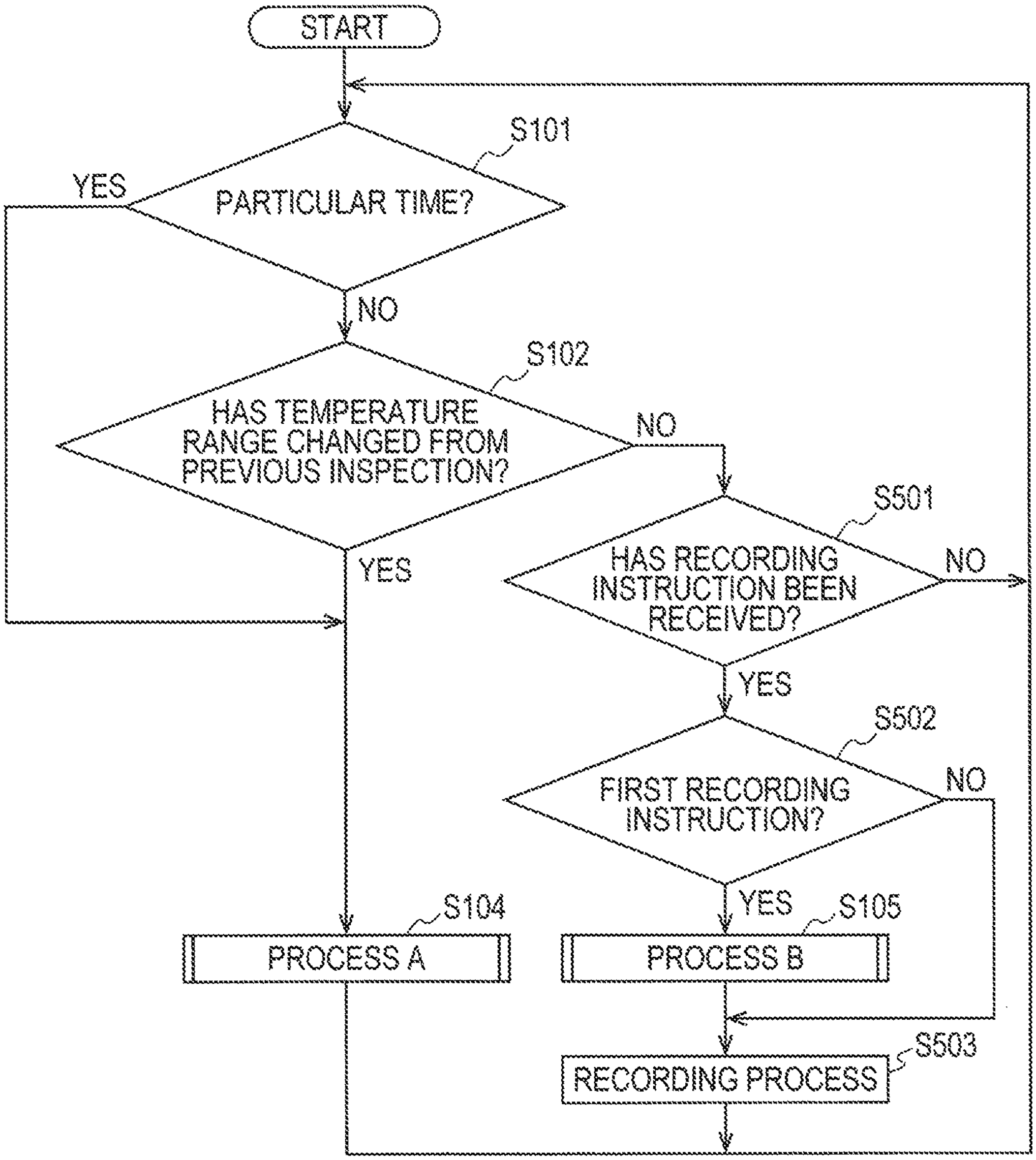
FIG. 9 is a flowchart similar to FIG. 5A.

In a first modification shown in FIG. 9, the controller 80 stands by while the time signal received from the clock 68 does not indicate a particular time (S101: NO), the temperature range including the temperature indicated by the temperature signal received from the temperature sensor 67 is the same as the temperature range including the temperature indicated by the temperature signal received from the temperature sensor 67 when the inspection driving is performed last time (S102: NO), and a recording instruction is not received (S501: NO).

As in the above-described embodiment, the controller 80 executes the process A (S104) when the time signal received from the clock 68 indicates that the time is the particular time (S101: YES), or when the temperature range including the temperature indicated by the temperature signal received from the temperature sensor 67 is different from the temperature range including the temperature indicated by the temperature signal received from the temperature sensor 67 when the inspection driving is performed last time (S102: YES).

When the recording instruction is received (S501: YES), and the received recording instruction is the recording instruction received first after the process A including the inspection process is executed in response to reception of the time signal indicating that the time is the particular time (S502: YES), the process B is executed (S105) similarly to the above-described embodiment, and then the recording process is executed (S503). If the received recording instruction is not the recording instruction received first after the process A including the inspection process is executed in response to reception of the time signal indicating that the time is a particular time (S502: NO), the recording process is executed (S503) without executing the process B. The recording process of S503 is the same process as S401 to S415 of the above-described embodiment.

In the first modification, the time signal indicating that the time is the particular time corresponds to the "first signal", as in the above-described embodiment. In the first modification, the recording instruction received first after the process A including the inspection process is executed in response to receiving the time signal indicating that the time is a particular time corresponds to the "second signal".

In the first modification, since the suction purge is performed immediately before recording on the recording sheet P, ink will not be wastefully discharged even if the period elapsed from the reception of the time signal indicating that the time is the particular time to the reception of the recording instruction is long.

When the printer 1 is unplugged at a particular time and power is supplied from the battery 66 to the controller 80, the inspection process is executed, but the inspection driving is not performed. When the battery 66 is out of power, the inspection process is not executed even at a particular time, and naturally, the inspection driving is not performed.

Thus, in this modification, at the time of reception of the recording instruction, in a case where the inspection driving is not performed at the last particular time before the reception of the recording instruction, the inspection driving is performed. As a result, an abnormal nozzle is grasped.

Figure 10:
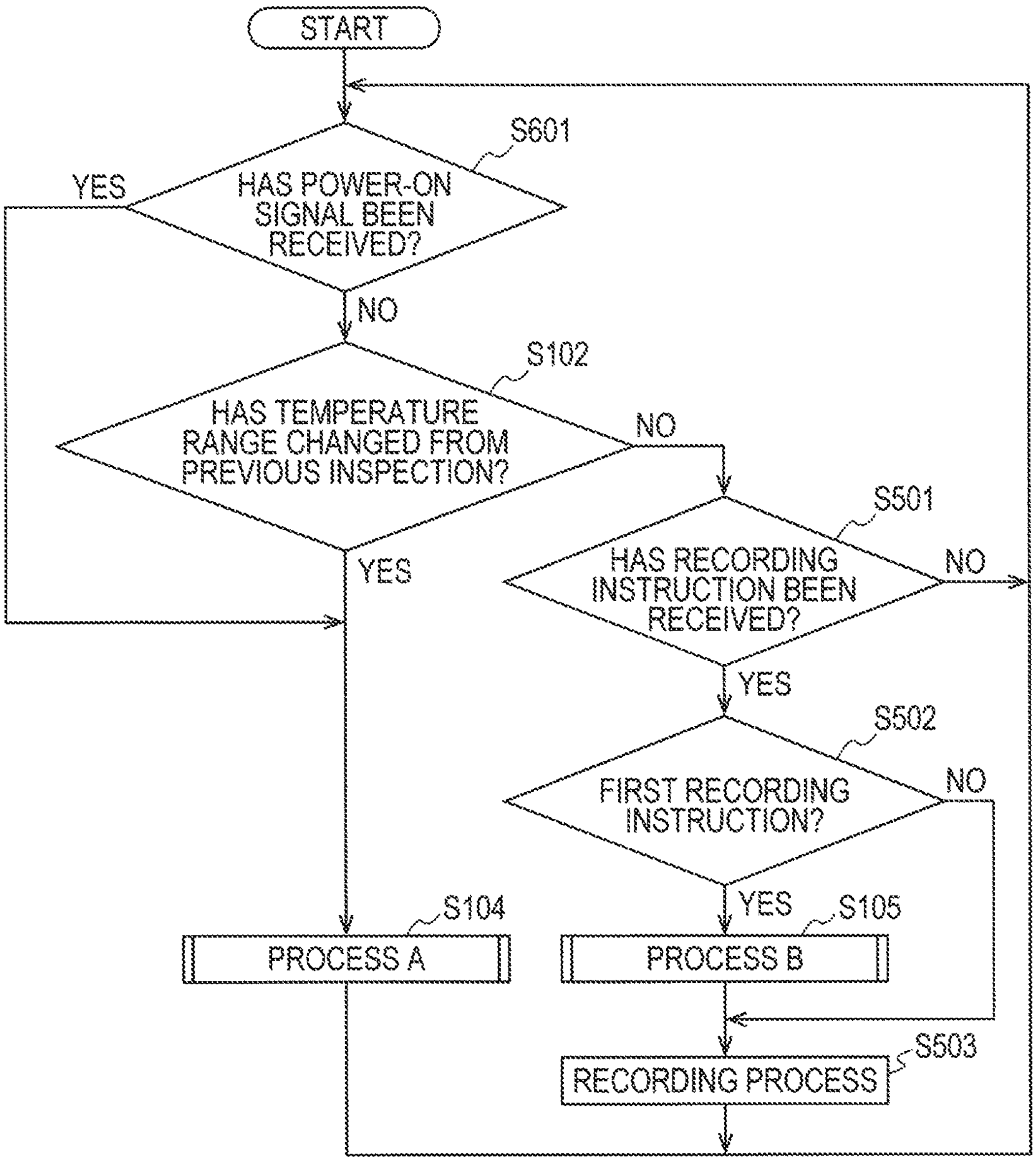
FIG. 10 is a flowchart similar to FIG. 5A.

In a second modification shown in FIG. 10, the controller 80 stands by while the power-on signal is not received (S601: NO), the temperature range including the temperature indicated by the temperature signal received from the temperature sensor 67 is the same as the temperature range including the temperature indicated by the temperature signal received from the temperature sensor 67 when the inspection driving is performed last time (S102: NO), and a recording instruction is not received (S501: NO).

The controller 80 executes the process A (S104) when the power-on signal is received (S601: YES), or when the temperature range including the temperature indicated by the temperature signal received from the temperature sensor 67 is different from the temperature range including the temperature indicated by the temperature signal received from the temperature sensor 67 when the inspection driving is performed last time (S102: YES). When the recording instruction is received (S501: YES), the processes of S502, S105, and S503 are executed as in the first modification.

In the second modification, ink will not be wastefully discharged even if the period elapsed from the reception of the power-on signal to the reception of the recording instruction is long.

In the second modification, the power-on signal corresponds to the "first signal". In the second modification, as in the first modification, the recording instruction received first after the process A including the inspection process is executed in response to receiving the time signal indicating that the time is a particular time corresponds to the "second signal".

In the first and second modifications, the controller 80 executes the process B when the recording instruction is received first after the process A including the inspection process is executed in response to receiving the first signal (the time signal indicating that the time is a particular time of the first modification and the power-on signal of the second modification). This disclosure is not limited to this. For example, the printer 1 may selectively perform either low image quality recording or high image quality recording, and the process B may be executed when a recording instruction instructing to perform high image quality recording is first received after the process A including the inspection process is executed in response to the first signal.

In the above-described embodiment, the process A is also executed when the temperature range including the temperature indicated by the temperature signal received from the temperature sensor 67 is different from the temperature range including the temperature indicated by the temperature signal received from the temperature sensor 67 when the inspection driving is performed last time. This disclosure is not limited to this. The process A may not be executed when the temperature range including the temperature indicated by the temperature signal received from the temperature sensor 67 has changed.

In the above-described embodiment, during recording on a plurality of recording sheets P, in a case where the number of recorded recording sheets P after the last inspection driving reaches a particular number (C≥Ct) after recording on all the recording sheets P is completed, the inspection driving is performed. This disclosure is not limited to this.

For example, when a relationship C≥Ct is satisfied in the middle of recording on a plurality of recording sheets P, the recording may be interrupted and the inspection driving may be performed.

Alternatively, the inspection driving based on the number of recording sheets P recorded after the last inspection driving was performed may not be performed.

In the above-described embodiment, flushing is performed as a part of the recovery operation when the determination signal output from the determination circuit 78 during the inspection driving that is performed at a particular time indicates that an abnormal nozzle exists. After that, when the power is turned on, suction purge is performed as the second part excluding the first part of the recovery operation. However, this disclosure is not limited to this.

For example, when the recovery operation is suction purge and the determination signal output from the determination circuit 78 during the inspection driving that is performed at a particular time indicates that an abnormal nozzle exists, a part of the suction purge may be performed as a part of the recovery operation. After that, when the power is turned on, the remaining part of the suction purge may be performed as the second part excluding the first part of the recovery operation.

Alternatively, when the recovery operation is flushing and the determination signal output from the determination circuit 78 during the inspection driving that is performed at a particular time indicates that an abnormal nozzle exists, a part of the flushing may be performed as a part of the recovery operation. After that, when the power is turned on, the remaining part of flushing may be performed as the second part excluding the first part of the recovery operation.

When the determination signal output from the determination circuit 78 during the inspection driving that is performed at a particular time indicates that an abnormal nozzle exists, a part of the recovery operation may not be performed. For example, when the determination signal output from the determination circuit 78 during the inspection driving that is performed at a particular time indicates that an abnormal nozzle exists, a part of the recovery operation may not be performed, and then the entirety of the recovery operation (flushing and/or purge) may be performed when the power is turned on.

In the above-described embodiment, the type information of suction purge is stored in the flash memory 84 and the type of suction purge is determined based on the determination signal output from the determination circuit 78 during the inspection driving, but this disclosure is not limited to this. For example, when the determination signal output from the determination circuit 78 during the inspection driving indicates that an abnormal nozzle exists, a single (one type) suction purge may be performed in the subsequent purge process.

In the above-described embodiment and the first modification, when the inspection driving is not performed when the process A including the inspection process is executed in response to receiving the time signal indicating that the time is a particular time, the inspection driving is subsequently performed in the process B that is executed when the power-on signal is received. In the second modification, in a case where the inspection driving is not performed when the process A including the inspection process is executed in response to receiving the power-on signal, the inspection process is subsequently executed in the process B that is executed when the recording instruction is received. However, this disclosure is not limited to this.

In a case where the inspection driving is not performed when the inspection process is executed in response to receiving the first signal (the time signal indicating that the time is a particular time in the above-described embodiment and the first modification and the power-on signal in the second modification), the inspection process may not be subsequently executed in response to receiving the second signal (the power-on signal in the above-described embodiment and the first modification and the recording instruction in the second modification). In this case, since the flag information is not stored in the flash memory 84 when the second signal is received, the recovery operation is not performed.

In the above-described embodiment, all the nozzles 10 of the inkjet head 4 are driven for inspection, but this disclosure is not limited to this. For example, the inspection driving may be performed only on some nozzles 10 of the inkjet head 4 such as every other nozzles 10 in each nozzle array 9, and it may be estimated for the other nozzles 10 whether it is an abnormal nozzle based on the determination signal output from the determination circuit 78 during the inspection driving.

The controller 80 stores the information itself indicating the type of suction purge to be performed as the type information in the flash memory 84, but this disclosure is not limited to this. For example, information for determining the type of suction purge, such as the number of abnormal nozzles and the positions of abnormal nozzles, may be stored as the type information.

In the above-described embodiment, the determination circuit 78 outputs a signal indicating whether the nozzle 10 is an abnormal nozzle depending on the potential of the detection electrode 76 when ink is ejected from the nozzle 10 toward the detection electrode 76. However, the method is not limited to this.

For example, a detection electrode extending in the vertical direction may be arranged, and a determination circuit may output a signal indicating whether the nozzle is an abnormal nozzle depending on the potential of the detection electrode when ink is ejected from the nozzle 10 so as to pass through the region facing the detection electrode. Alternatively, an optical sensor ("signal output circuit" of this disclosure) for detecting the ink ejected from the nozzle 10 may be provided, and the optical sensor may output a signal indicating whether the nozzle is an abnormal nozzle.

Alternatively, for example, as described in Japanese Patent No. 4929699, a voltage detection circuit for detecting a change in voltage when ink is ejected from a nozzle ("signal output circuit" of this disclosure) may be connected to a plate of the inkjet head in which nozzles are formed, and the voltage detection circuit may output, to the controller 80, a signal indicating whether the nozzle is an abnormal nozzle.

Alternatively, for example, as described in Japanese Patent No. 6231759, the control board of the inkjet head may be provided with a temperature detection element ("signal output circuit" of this disclosure). After applying a first applied voltage to drive the heater for ink ejection, a second applied voltage may be applied to drive the heater so that ink is not ejected, and thereafter a signal indicating whether the nozzle 10 is an abnormal nozzle may be output based on the change in temperature detected by the temperature detection element until a particular time elapses.

In the above example, the nozzle 10 from which ink is not ejected is determined to be an abnormal nozzle, but the present disclosure is not limited to this. For example, a signal output circuit for outputting a signal indicating whether the ink ejection direction from the nozzle 10 is normal may be provided, and a nozzle 10 having an abnormality in the ejection direction may be determined to be an abnormal nozzle based on the signal from the signal output circuit.

In the above example, a suction purge is performed in the purging process, but the present disclosure is not limited to this. For example, a pressure pump may be provided in the middle of the tube 15 that connects the sub tank 3 and the ink cartridge 14. Alternatively, the printer may be provided with a pressure pump connected to an ink cartridge. In a state where the plurality of nozzles 10 are covered with the cap 71, the pressure pump may be driven to pressurize ink in the inkjet head 4 and discharge the ink in the inkjet head 4 from the nozzles 10, which is so-called a pressure purge.

Further, in the purge process, both suction by the suction pump 72 and pressurization by the pressure pump may be performed.

In the above example, the present disclosure is applied to a printer provided with a so-called serial head, which ejects ink from a plurality of nozzles while moving in the scanning direction together with the carriage, but the present disclosure is not limited to this. For example, this disclosure may be applied to a printer provided with a so-called line head extending over the entire length of the recording sheet P in the scanning direction.

In the above example, the present disclosure is applied to a printer that ejects ink from nozzles and records on a recording sheet P, but the present disclosure is not limited to this. This disclosure may also be applied to a printer that records an image on a recording medium other than a recording sheet, such as a T-shirt, a sheet for outdoor advertising, a case of a mobile terminal such as a smartphone, a corrugated cardboard, and a resin member. This disclosure may also be applied to a liquid ejection apparatus that ejects liquid other than ink, for example, a liquefied resin or metal.

What is claimed is:

1. A liquid ejection apparatus comprising:

a liquid ejection head having a nozzle configured to eject liquid;

a signal output circuit configured to, when inspection driving is performed by the liquid ejection head, output a determination signal indicating whether the nozzle is an abnormal nozzle, the inspection driving being driving the liquid ejection head to eject liquid from the nozzle for checking whether the nozzle is the abnormal nozzle;

a recovery device configured to perform a recovery operation of discharging liquid from the nozzle;

a memory; and a controller configured to:

receive a first signal, the first signal being a power-on signal indicating that power of the liquid ejection apparatus is turned on;

in response to receiving the first signal, perform the inspection driving and, in response to determining that the determination signal transmitted from the signal output circuit indicates that the abnormal nozzle exists, store flag information in the memory, the flag information indicating that the recovery operation needs to be performed;

after storing the flag information in the memory, receive a second signal different from the first signal; and in response to receiving the second signal and determining that the memory stores the flag information, control the recovery device to perform the recovery operation.

2. The liquid ejection apparatus according to claim 1, wherein the recovery device is configured to selectively perform a plurality of types of the recovery operation; and wherein the controller is configured to:

when the determination signal indicates that the abnormal nozzle exists, store the flag information and type information in the memory, the type information indicating a type of the recovery operation based on the determination signal; and in response to receiving the second signal and determining that the memory stores the flag information, control the recovery device to perform the recovery operation indicated by the type information.

3. The liquid ejection apparatus according to claim 1, wherein the controller is configured to:

in a case where the determination signal indicates that the abnormal nozzle exists, store the flag information in the memory and control the recovery device to perform a first part of the recovery operation; and in response to receiving the second signal and determining that the memory stores the flag information, control the recovery device to perform a second part of the recovery operation, the second part being a part of the recovery operation excluding the first part.

4. The liquid ejection apparatus according to claim 3, wherein the recovery device includes:

the liquid ejection head; and a pump connectable with the liquid ejection head; and wherein the controller is configured to:

as the first part of the recovery operation, control the liquid ejection head to perform flushing of discharging liquid from the nozzle; and as the second part of the recovery operation, control the pump to perform purge of discharging liquid in the liquid ejection head from the nozzle.

5. The liquid ejection apparatus according to claim 3, wherein the recovery device includes a pump connectable with the liquid ejection head; and wherein the controller is configured to:

as the first part of the recovery operation, control the pump to perform a part of purge of discharging liquid in the liquid ejection head from the nozzle; and as the second part of the recovery operation, control the pump to perform a remaining part of the purge.

6. The liquid ejection apparatus according to claim 3, wherein the recovery device includes the liquid ejection head; and wherein the controller is configured to:

as the first part of the recovery operation, control the liquid ejection head to perform a part of flushing of discharging liquid from the nozzle; and as the second part of the recovery operation, control the liquid ejection head to perform a remaining part of the flushing.

7. The liquid ejection apparatus according to claim 1, wherein the second signal is an ejection instruction signal for instructing the liquid ejection head to eject liquid from the nozzle toward a medium.

8. The liquid ejection apparatus according to claim 7, wherein the second signal is the ejection instruction signal that is received first after the first signal is received.

9. The liquid ejection apparatus according to claim 1, wherein the controller is configured to:

perform the inspection driving; and again perform the inspection driving in response to determining that a number of mediums to which liquid is ejected by the liquid ejection head after the inspection driving is performed last time reaches a particular number.

10. The liquid ejection apparatus according to claim 9, wherein the controller is configured to:

in a case where the liquid ejection head is controlled to eject liquid from the nozzle to a plurality of mediums sequentially and the number of mediums to which liquid is ejected by the liquid ejection head after the inspection driving is performed last time reaches the particular number before completing ejection of liquid to the plurality of mediums, perform the inspection driving after completing ejection of liquid to the plurality of mediums.

11. The liquid ejection apparatus according to claim 1, wherein the recovery device includes:

the liquid ejection head; and a pump connectable with the liquid ejection head; and wherein the controller is configured to:

in response to receiving the first signal and determining that the determination signal indicates that the abnormal nozzle exists, store the flag information in the memory without performing the recovery operation; and in response to receiving the second signal and determining that the memory stores the flag information, control the recovery device to perform at least purge or flushing as the recovery operation, the purge being controlling the pump to discharge liquid in the liquid ejection head from the nozzle, the flushing being controlling the liquid ejection head to discharge liquid from the nozzle.

12. A liquid ejection apparatus comprising:

a liquid ejection head having a nozzle configured to eject liquid;

a signal output circuit configured to, when inspection driving is performed by the liquid ejection head, output a determination signal indicating whether the nozzle is an abnormal nozzle, the inspection driving being driving the liquid ejection head to eject liquid from the nozzle for checking whether the nozzle is the abnormal nozzle;

a recovery device configured to perform a recovery operation of discharging liquid from the nozzle;

a temperature sensor configured to output a temperature signal indicating a temperature;

a memory; and a controller configured to:

in response to receiving a first signal, perform the inspection driving and, in response to determining that the determination signal transmitted from the signal output circuit indicates that the abnormal nozzle exists, store flag information in the memory, the flag information indicating that the recovery operation needs to be performed;

in response to receiving a second signal different from the first signal and determining that the memory stores the flag information, control the recovery device to perform the recovery operation;

perform the inspection driving in a state where the temperature indicated by the temperature signal is in a first temperature range; and again perform the inspection driving in response to determining that the temperature indicated by the temperature signal changes from a temperature in the first temperature range to a temperature in a second temperature range different from the first temperature range.

13. The liquid ejection apparatus according to claim 12, wherein the second signal is a power-on signal indicating that power of the liquid ejection apparatus is turned on.

14. A liquid ejection apparatus comprising:

a liquid ejection head having a nozzle configured to eject liquid, wherein the liquid ejection head has a plurality of nozzles each configured to eject liquid, the plurality of nozzles including the nozzle;

a signal output circuit configured to, when inspection driving is performed by the liquid ejection head, output a determination signal indicating whether the nozzle is an abnormal nozzle, the inspection driving being driving the liquid ejection head to eject liquid from the nozzle for checking whether the nozzle is the abnormal nozzle;

a recovery device configured to perform a recovery operation of discharging liquid from the nozzle;

a memory; and a controller configured to:

in response to receiving a first signal, perform the inspection driving and, in response to determining that the determination signal transmitted from the signal output circuit indicates that the abnormal nozzle exists, store flag information in the memory, the flag information indicating that the recovery operation needs to be performed;

in response to receiving a second signal different from the first signal and determining that the memory stores the flag information, control the recovery device to perform the recovery operation;

in a case where a number of the abnormal nozzle is smaller than or equal to a threshold, perform a first type of the recovery operation in which a first amount of liquid is discharged; and in a case where the number of the abnormal nozzle is larger than the threshold, perform a second type of the recovery operation in which a second amount of liquid is discharged, the second amount being larger than the first amount.

15. A liquid ejection apparatus comprising:

a liquid ejection head having a nozzle configured to eject liquid;

a signal output circuit configured to, when inspection driving is performed by the liquid ejection head, output a determination signal indicating whether the nozzle is an abnormal nozzle, the inspection driving being driving the liquid ejection head to eject liquid from the nozzle for checking whether the nozzle is the abnormal nozzle;

a recovery device configured to perform a recovery operation of discharging liquid from the nozzle;

a memory; and a controller configured to:

receive a first signal different from a print instruction by a user;

in response to receiving the first signal, perform the inspection driving and, in response to determining that the determination signal transmitted from the signal output circuit indicates that the abnormal nozzle exists, store flag information in the memory, the flag information indicating that the recovery operation needs to be performed;

after storing the flag information in the memory, receive a second signal that is the print instruction by the user; and in response to receiving the second signal and determining that the memory stores the flag information, control the recovery device to perform the recovery operation.

16. The liquid ejection apparatus according to claim 15, further comprising a clock configured to output a time signal indicating time, wherein the first signal is the time signal indicating a particular time.

17. The liquid ejection apparatus according to claim 15, further comprising a clock configured to output a time signal indicating time, wherein the controller is configured to:

in response to receiving, as the first signal, the time signal indicating a particular time transmitted from the clock, perform an inspection process for performing the inspection driving; and in response to determining that, when power of the liquid ejection apparatus is turned on, the inspection driving is not performed at the particular time immediately before the power is tuned on, perform the inspection process.

18. The liquid ejection apparatus according to claim 15, further comprising a clock configured to output a time signal indicating time, wherein the controller is configured to:

in response to receiving, as the first signal, the time signal indicating a particular time transmitted from the clock, perform an inspection process for performing the inspection driving; and in response to receiving the second signal and determining that the inspection driving is not performed at the particular time immediately before receiving the second signal, perform the inspection process.

19. A liquid ejection apparatus comprising:

a liquid ejection head having a nozzle configured to eject liquid;

a signal output circuit configured to, when inspection driving is performed by the liquid ejection head, output a determination signal indicating whether the nozzle is an abnormal nozzle, the inspection driving being driving the liquid ejection head to eject liquid from the nozzle for checking whether the nozzle is the abnormal nozzle;

a recovery device configured to perform a recovery operation of discharging liquid from the nozzle;

a clock configured to keep time of day, a memory configured to store time information indicating a particular time of day; and a controller configured to:

in response to receiving a first signal that the time of day indicated by the clock reaches the particular time of day indicated by the time information stored in the memory, perform the inspection driving and, in response to determining that the determination signal transmitted from the signal output circuit indicates that the abnormal nozzle exists, store flag information in the memory, the flag information indicating that the recovery operation needs to be performed; and in response to receiving a second signal different from the first signal and determining that the memory stores the flag information, control the recovery device to perform the recovery operation.

20. The liquid ejection apparatus according to claim 19, wherein the second signal is a print instruction by a user.

21. The liquid ejection apparatus according to claim 20, wherein the second signal is the print instruction by a user that is received first after the first signal is received.

* * * * *